Oct. 23, 1962 H. M. SCHLICKE 3,060,391

NARROW BAND HIGH FREQUENCY FILTER

Filed April 16, 1959

INVENTOR

Heinz M. Schlicke

BY

Arthur H. Seidel

ATTORNEY 3,060,391
Patented Oct. 23, 1962

3,060,391
NARROW BAND HIGH FREQUENCY FILTER

Heinz M. Schlicke, Fox Point, Wis., assignor to Allen-Bradley Company, Milwaukee, Wis., a corporation of Wisconsin Filed Apr. 16, 1959, Ser. No. 806,979
9 Claims. (Cl. 333—73)

Figure 1:
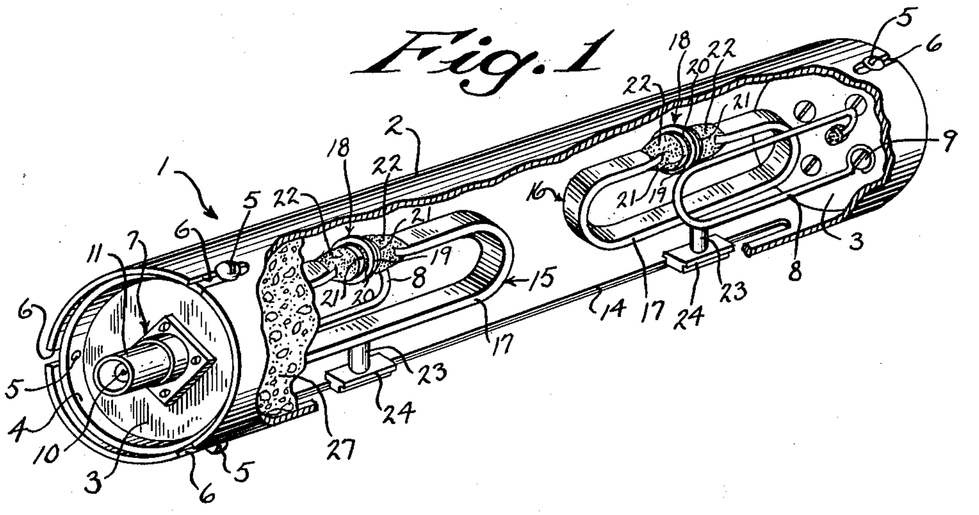

This invention relates to filters and more particularly resides in a narrow band pass filter comprising a pair of electromagnetically coupled filter circuits housed in a wave guiding enclosure, each of the filter circuits including a capacitor and a metallic current carrying path joining the ends of the capacitor, the filter circuits in turn being coupled to antennas within the enclosure for introducing and withdrawing RF energy.

In the construction of radio-frequency band pass filters designed to handle large amounts of power at least two significant difficulties are encountered. First, practical considerations frequently require a filter of small physical dimensions despite the extremely high power requirements. Second, in order to achieve a suitable degree of operational stability, heat dissipating means must be incorporated into the structure, such means being obviously of even greater importance as the physical dimensions of the filter are reduced. The present invention provides a filter that meets these problems and which is operable in the very high frequency range, of which 250M c.p.s. is a typical operating frequency. Such filter is suitable for a wide range of applications, such as separating transmitters or receivers, use in multiplex systems, and other filtering wherein a very narrow band pass is desired.

It is an object of this invention to provide a narrow band pass filter for high frequency work which is capable of handling large amounts of power.

It is another object of this invention to provide a band pass filter of small overall size which has stable operating characteristics over a wide range of temperature.

It is another object of this invention to provide a band pass filter that is capable of dissipating heat to permit reduction of size and stability of operation.

It is another object of this invention to provide a band pass filter having a high Q factor and in which the transmission of power is carried out with a minimum of insertion loss.

It is another object of this invention to provide a narrow band pass filter having the foregoing characteristics in which the frequency band has extremely steep slopes and is of narrow width.

It is another object of this invention to provide a narrow band pass filter of extremely rugged construction which will withstand excessive vibrations to which it may be subject.

It is another object of this invention to provide for close physical coupling of a pair of tuned circuits through the use of a wave guiding enclosure that completely shields the active filter components.

The foregoing and other objects and advantages of this invention will appear from the description to follow. In the description reference is made to the accompanying drawing, which forms a part hereof, and in which there is shown by way of illustration and not of limitation a specific embodiment in which this invention may reside.

Figure 2:
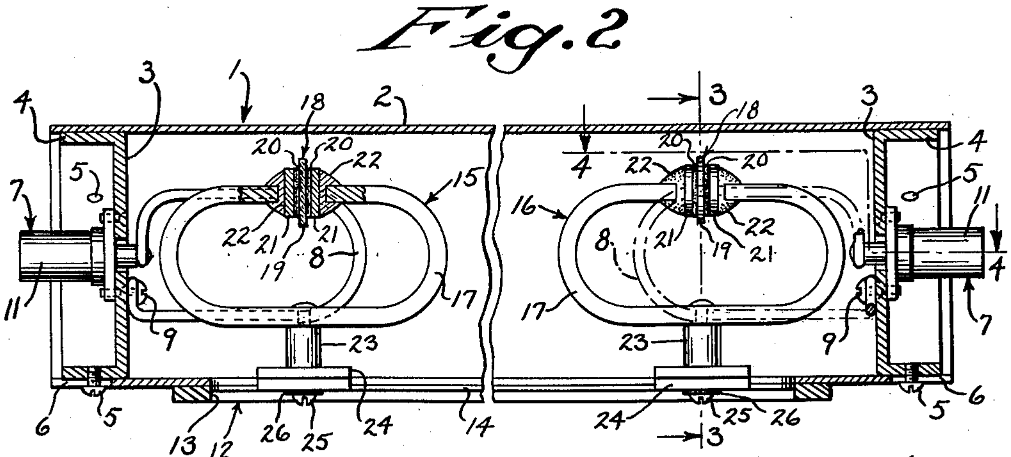
Figure 3:
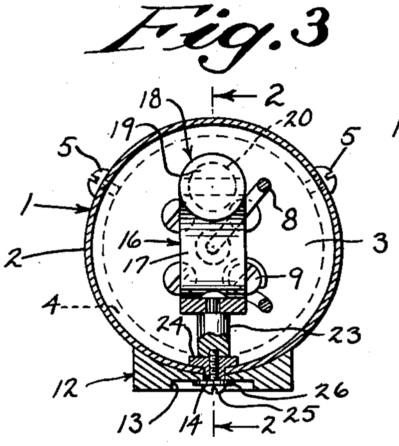
Figure 4:
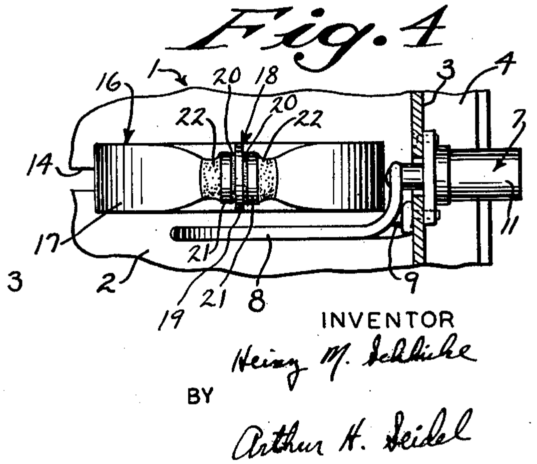

In the drawing:

FIG. 1 is a view in perspective with parts broken away and in section of a filter in which the invention is embodied, FIG. 2 is a side view in elevation and in section of the filter of FIG. 1, FIG. 3 is a view in transverse cross section taken on the plane 3—3 shown in FIG. 2, and FIG. 4 is a fragmentary view of the filter taken on the plane 4—4 shown in FIG. 2.

Referring now to the drawing, a filter 1 is shown which has a tubular circular cylindrical casing 2 formed of metal to act as a wave guiding shield, as will hereinafter be explained. Each end of the casing 2 is closed by a circular plate 3 having a circumferential flange 4 that fits snugly within the casing 2. A set of mounting screws 5 project radially from the flange 4 and extend through associated slots 6 in the wall of the casing 2. With this construction, the plates 3 may be adjusted in position by a sliding movement within the casing 2, and once the plates 3 are set in desired position they are clampingly held in such position by tightening the mounting screws 5 down upon the outer surface of the casing 2.

Projecting axially outward from each plate 3 is a terminal connector 7 suitable for joining with a co-axial cable. Each connector 7 joins with a single turn loop antenna 8 that is mounted on the inner face of the associated plate 3. One end of each loop antenna 8 is connected by a mounting screw 9 directly to the inner face of its associated plate 3, and the opposite end of each antenna 8 is connected to a central conductor 10 of the associated connecter 7. Each connector 7 has its outer conductor 11 in direct electrical engagement with the associated plate 3, whereby each antenna 8 will be electrically joined with any input or output cable connected to its associated connector 7.

A heat conductive mounting base 12 is brazed or soldered to the lower surface of the casing 2. The base 12 fits tightly against the underside of the casing 2 to form a continuous metallic construction that will conduct heat rapidly away from the casing 2 through the base 12 to a chassis or panel upon which the base 12 is intended to be mounted. The base 12 extends along a major portion of the underside of the casing 2, as shown in FIG. 2, and as viewed from the bottom is of a generally rectangular configuration with a longitudinally extending recess 13. A slot 14 extends through the base 12 and the casing 2 along the entire length of the recess 13, as shown in FIG. 2, to thereby provide a mounting track for a pair of tuned circuits 15 and 16 that will now be described.

The particular tuned circuits 15 and 16 shown in the drawing are identical, and like reference numerals are applied to the respective elements of each circuit. Each circuit 15, 16 has a single turn loop 17 of substantial cross section that presents a relatively large highly polished surface area. The loops 17 may be formed from aluminum or copper and then silver plated and polished to achieve a minimum of resistance to current flow. Inserted between the ends of each single turn loop 17 is a capacitor 18 having a dielectric 19 and thin electrodes 20. A typical capacitor 18 will comprise a temperature stable ceramic dielectric formed of a thin wafer of a titanate material and electrodes in the form of a silver paste. Such capacitors are somewhat fragile and are easily fractured. To reduce stresses due to thermally induced dimensional changes, a steel insert 21 is placed alongside each electrode 20 which has a temperature coefficient of expansion compatible to that of the dielectric 19. Then, each insert 21 is connected through solder connections 22 to the associated single turn loop 17, whereby the loop 17 and the capacitor 18 comprise the inductive and capacitive elements, respectively, of a tuned circuit. By appropriate proportioning of these two elements the circuit can be tuned to the desired frequency.

Each single turn loop 17 is mounted upon an upright pedestal 23 which stands upon a slide 24 having a T-shaped cross section, as shown in FIG. 3. The slides 24 fit in and are movable along the slot 14, and an assembly screw 25 is received on the under side of each slide 24. A small washer 26 fits between the head of each assembly screw 25 and overlies the bottom surface of the recess 13, so that upon tightening down the screws 25 the tuned circuits 15 and 16 are secured in place.

With the parts of the filter 1 assembled as described in the foregoing paragraphs additional mechanical rigidity is imparted to the elements within the casing 2 by introduction of an appropriate foam 27, a fragmentary portion of which is shown in FIG. 1. The foam 27, which is of very low electrical loss, is introduced as a liquid and sets up as a hardened filler material that retains the elements in fixed position so as to reduce mechanical vibrations which may be imparted to the apparatus of this invention when in use.

In a typical application the terminal connector 7 at the right hand side of the filter 1 may be connected to a source of very high frequency, such as a transmitter, and the terminal connector 7 at the left hand side of the filter 1 may be connected to a transmitting antenna. Thus, the filter 1 is inserted between a source of radio frequency power and an antenna, to function as a narrow band pass filter which will conduct the specific output frequency of the source to the transmitting antenna, but which will block other frequencies which might otherwise pass from the antenna back to the source. The right hand loop antenna 8 is positioned to the immediate side of the tuned circuit 16 whereby these two elements are electromagnetically coupled for introducing the very high frequency to the tuned circuit 16. The tuned circuit 16 is electromagnetically coupled to the tuned circuit 15, whereby waves of energy are transmitted from circuit to circuit. The tuned circuit 15, in turn, is coupled with the left hand loop antenna 8, which receives energy from the circuit 15 and hence conducts it from the filter 1 to the transmitting antenna.

To secure a narrow band pass filter a high Q factor is sought for the tuned circuits 15 and 16. To this end, the single turn loops 17 provide substantial surface areas which are highly polished to have a minimum of resistance loss. The impedances of the incoming and outgoing conductors joined to the connectors 7 are usually of such value as to prohibit attainment of the desired Q factors necessary for attaining a steep sided narrow pass band of frequency. The invention, accordingly, transfers power to the tuned circuits 15, 16 which have a high Q factor and small insertion loss.

The oscillatory currents of the tuned circuits 15 and 16 are very substantial, for the filter of the invention may transmit power of the order of 25 watts or more. Temperature increases can become large when such power is transmitted and in order to achieve stability of operation it is essential to achieve heat dissipation which rapidly and efficiently draws and conducts the heat away from the tuned circuits 15 and 16. The pedestals 23 are of a high heat conductivity and are of large cross section to afford a heat path which will achieve the foregoing objectives. Heat is not evolved in the tuned circuits 15 and 16 alone. The casing 2 presents a conductive shield at which magnetic fields within the filter 1 diminish to zero value. Surface currents along the inner surface of the casing 2 that are required to establish this condition account for additional power loss that should be minimized in order to achieve an overall low insertion loss. It is a particular purpose of the invention to present only a small insertion loss in the circuit while providing a filter capable of handling large amounts of power. To this end, that component of the insertion loss due to the currents in the casing 2 is minimized by providing a highly polished interior surface for the casing 2. In addition, the casing 2 is in effective heat dissipating relation to the mounting base 12, whereby heat evolution due to surface currents is rapidly conducted away from the apparatus of the invention.

A particular object of the invention is to provide a filter capable of handling large amounts of power that is of minimal overall dimension. It is a particular discovery of the invention that by enclosure of the tuned circuits 15 and 16 within a wave guiding casing 2 permits reduction of overall size. A cross section dimension for the casing 2 is selected which causes the frequencies to be passed by the filter to be below the cutoff frequency of the wave guiding casing. For a casing 2 of circular cross section this dimension is less than one-half the wave length. The resulting sharp attenuating effect of the wave guiding casing 2 permits the tuned circuits 15 and 16 to be spaced close to one another. The close spacing sharply contrasts with that had in free space for a like coupling factor. The invention therefore provides a power filter that is stable throughout a wide temperature range which is of reduced overall dimension and which provides a narrow pass band of frequencies characterized by steep slopes.

In adjusting the filter 1 for use the tuned circuits 15 and 16 are spaced to achieve a coupling factor commensurate with maximum power transfer. The antennas 8 are also adjusted in position with respect to the circuits 15, 16 to achieve selection of exact frequencies to be passed by the filter. It is contemplated that after initial adjustment the parts may be permanenly secured tightly in place.

I claim:

1. In a high frequency filter the combination comprising a metallic enclosure having highly polished interior side walls; a pair of magnetically coupled tuned circuits disposed within said enclosure, each of said circuits including a capacitor and a high polished metallic current loop joining the ends of said capacitor; heat conductive mounting means for said circuits supporting said circuits from the interior side walls of the enclosure so as to be spaced therefrom and providing a heat path leading from the circuits to the enclosure; and a pair of antennas mounted within the enclosure each at the side of one of said circuits for introducing and withdrawing RF energy.

2. A filter as in claim 1 with a hardened foam in the interior of the enclosure acting to maintain the tuned circuits in set position.

3. In a high frequency filter the combination comprising a metallic enclosure having highly polished interior side walls and including a mounting track; a pair of magnetically coupled circuits disposed within said enclosure, each of said circuits including a capacitor and a highly polished metallic current loop joining the ends of the capacitor; a pedestal of heat conductive material for each circuit which supports the current loop of its associated circuit so that the loop is spaced along its entire length from the interior side walls of said enclosure, at least one pedestal being mounted on and slidable along said track for critical coupling by relative movement thereof; and a pair of antennas adjustably mounted within the enclosure each at the side of one of said circuits for introducing and withdrawing RF energy.

4. In a high frequency filter the combination comprising a metallic cylinder forming a magnetic shield to house the filter; a pair of magnetically coupled tuned circuits disposed within said cylinder, each of said circuits including a coil with a substantial central opening and a capacitor connected between the ends of the coil, the circuits having the coils extending longitudinally with the central openings being transverse of the cylinder and with all parts of the coils being spaced from the metallic cylinder to maintain a coupled magnetic field along the length of the coil, a heat conductive member joining each coil to the cylinder, such members each extending radially within the cylinder in the plane of the associated coil; and a pair of antennas, one of said antennas being mounted at each end of said cylinder for introducing and withdrawing RF energy.

5. A filter in accordance with claim 4 in which the cross section dimension of the cylinder is less than the cut-off dimension of a wave guide for the frequency to which the tuned circuits are tuned.

6. In a high frequency filter the combination comprising a wave guiding enclosure having a highly polished interior; a pair of magnetically coupled tuned circuits disposed within said cylinder, each of said circuits including a single turn coil having a highly polished surface and a capacitor connected between the ends of the coil; a pair of antennas, each of said antennas being mounted alongside one of said tuned circuits for introducing and withdrawing RF energy; and a heat conductive mounting pedestal supporting each of said tuned circuits providing a heat path from each circuit to the enclosure, each pedestal supporting its associated circuit with the coil spaced from the enclosure along its entire length.

7. A filter in accordance with claim 6 in which a cross section dimension of the enclosure is less than half the wave length of the frequency for which said circuits are tuned.

8. In a high frequency filter the combination comprising a wave guiding enclosure; and a pair of tuned circuits in said enclosure coupled with one another, each of said circuits comprising a highly polished single turn stiff metallic coil and a capacitor having a relatively fragile dielectric which is connected between the ends of the coil, there being interposed between each coil end and the capacitor a conductive insert having a temperature coefficient of expansion compatible with that of said dielectric; and heat conductive mounting means for said circuits supporting said circuits from the enclosure so as to be spaced therefrom and providing a heat path leading from the circuits to the enclosure which is substantially transverse to the length of the enclosure.

9. In a high frequency filter the combination comprising a metallic wave guide enclosure having lengthwise extending side walls defining an interior; a first tuned circuit within said interior comprising a polished metallic current loop disposed with the plane of the loop substantially parallel to the lengthwise direction of said enclosure and a capacitor interposed in the loop to form an inductive-capacitive circuit with resonance at a selected frequency; a heat conductive pedestal mounting said circuit in spaced relation to said side walls and in heat transferring relation to said enclosure; a second tuned circuit coupled to said first tuned circuit within said interior comprising a polished metallic current loop disposed with the plane of the loop substantially parallel to the lengthwise direction of said enclosure and a capacitor interposed in the loop to form an inductive-capacitive circuit with resonance at a selected frequency; a heat conductive pedestal mounting said second circuit in a position spaced from said side walls which is longitudinal of said first tuned circuit and in heat transferring relation to said enclosure; the transverse dimensions of the interior of the wave guide enclosure being selected so that the wave guide has a cut-off frequency greater than that to which said tuned circuits are resonant; and antenna within the enclosure for introducing and withdrawing RF energy.

References Cited in the file of this patent

UNITED STATES PATENTS

| | | |
|---|---|---|
| 2,028,534 | Crossley | Jan. 21, 1936 |
| 2,082,589 | Neighbors | June 1, 1937 |
| 2,206,096 | Klotz | July 2, 1940 |
| 2,798,206 | Baroch | July 2, 1957 |